(12) United States Patent
Yahaya et al.

(10) Patent No.: US 10,913,036 B2
(45) Date of Patent: Feb. 9, 2021

(54) CARDO-TYPE CO-POLYIMIDE MEMBRANES FOR SOUR GAS FEED SEPARATIONS FROM NATURAL GAS

(71) Applicant: Saudi Arabian Oil Company, Dhahran (SA)

(72) Inventors: Garba Oloriegbe Yahaya, Dhahran (SA); Ilham Mokhtari, Dhahran (SA); Ahmad A. Bahamdan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 438 days.

(21) Appl. No.: 15/991,943

(22) Filed: May 29, 2018

(65) Prior Publication Data

US 2018/0345229 A1 Dec. 6, 2018

Related U.S. Application Data

(60) Provisional application No. 62/512,822, filed on May 31, 2017.

(51) Int. Cl.
| | | |
|---|---|---|
| B01D 71/64 | (2006.01) | |
| B01D 53/22 | (2006.01) | |
| B01D 71/80 | (2006.01) | |
| C10L 3/10 | (2006.01) | |
| B01D 53/52 | (2006.01) | |

(52) U.S. Cl.
CPC .......... *B01D 71/64* (2013.01); *B01D 53/228* (2013.01); *B01D 53/52* (2013.01); *B01D 71/80* (2013.01); *C10L 3/102* (2013.01); *B01D 2256/24* (2013.01); *B01D 2256/245* (2013.01); *B01D 2257/304* (2013.01); *B01D 2257/50* (2013.01); *B01D 2257/504* (2013.01); *C10L 2290/548* (2013.01)

(58) Field of Classification Search
CPC ...... B01D 71/64; B01D 53/228; B01D 53/52; B01D 71/80; B01D 2256/24; B01D 2256/245; B01D 2257/304; B01D 2257/50; B01D 2257/504; C10L 3/102; C10L 2290/548
USPC .......................................................... 502/4
See application file for complete search history.

(56) References Cited

U.S. PATENT DOCUMENTS

| | | | |
|---|---|---|---|
| 3,246,449 A | 4/1966 | Stern | |
| 4,705,540 A | 11/1987 | Hayes | |
| 4,717,407 A | 1/1988 | Choe | |
| 4,880,442 A | 11/1989 | Hayes | |
| 4,952,220 A | 8/1990 | Langsam | |
| 4,954,144 A | 9/1990 | Burgoyne | |
| 5,042,992 A | 8/1991 | Blinka | |
| 5,055,116 A | 10/1991 | Kohn | |
| 5,165,963 A | 11/1992 | Matsumoto | |
| 5,178,940 A | 1/1993 | Matsumoto | |
| 5,202,411 A | 4/1993 | Itatani | |
| 5,234,471 A | 8/1993 | Weinberg | |
| 5,318,116 A | 6/1994 | Vinegar | |
| 5,391,219 A | 2/1995 | Matsumoto | |
| 5,413,852 A | 5/1995 | Chung et al. | |
| 5,591,250 A | 1/1997 | Stern | |
| 5,725,633 A | 3/1998 | Ozcayir | |
| 5,759,442 A | 6/1998 | Auman et al. | |
| 5,817,165 A | 10/1998 | Hachisuka | |
| 6,383,258 B1 | 5/2002 | Simmons | |
| 6,565,626 B1 | 5/2003 | Baker | |
| 6,709,491 B2 | 3/2004 | Kawakami | |
| 6,790,263 B1 | 9/2004 | Ding | |
| 8,614,288 B2 | 12/2013 | Liu | |
| 8,668,992 B2 | 3/2014 | Hong et al. | |
| 9,962,646 B2 | 5/2018 | Yahaya et al. | |
| 2004/0071990 A1 | 4/2004 | Moriyama et al. | |
| 2005/0217479 A1 | 10/2005 | Hale | |
| 2008/0262191 A1 | 10/2008 | Mizori | |
| 2014/0047976 A1 | 2/2014 | Yeong et al. | |
| 2014/0137735 A1 | 5/2014 | Bhandari | |
| 2014/0144324 A1 | 5/2014 | Yamanaka et al. | |
| 2014/0144325 A1 | 5/2014 | Yamanaka et al. | |
| 2014/0148548 A1 | 5/2014 | Yamanaka et al. | |
| 2014/0174293 A1 | 6/2014 | Yamanaka et al. | |
| 2014/0243574 A1 | 8/2014 | Karode | |
| 2015/0005468 A1 | 1/2015 | Osman et al. | |
| 2015/0010986 A1 | 1/2015 | Oh et al. | |
| 2017/0189850 A1 | 7/2017 | Yahaya et al. | |

FOREIGN PATENT DOCUMENTS

| | | |
|---|---|---|
| CN | 103846022 A | 6/2014 |
| DE | 10247417 A1 | 4/2004 |
| DE | 102005008597 A1 | 8/2006 |

(Continued)

OTHER PUBLICATIONS

A. Hillock, et al., Crosslinked Mixed Matrix Membranes for the Purification of Natural Gas: Effects of Sieve Surface Modification, Journal of Membrane Science, 314 (2008) 193-199.
Achoundong, Silane Modification of Cellulose Acetate Dense Films as Materials for Acid Gas Removal, Macromolecules, 2013, 46, 5585-5594.
Aksari, Natural Gas Purification and olefin/paraffin separation using cross-linkable 6FDA-Durene/DABA co-polyimides grafted with a, B, and y-Cyclodextrin, Journal of Membrane Science, 390-391 (2012) pp. 141-151.
C. Orme, et al., Mixed Gas Hydrogen Sulfide Permeability and Separation Using Supported Polyphosphazene Membranes, Journal of Membrane Science, 253 (2005) 243-249.

(Continued)

*Primary Examiner* — Edward M Johnson
(74) *Attorney, Agent, or Firm* — Bracewell LLP; Constance G. Rhebergen; Kevin R. Tamm

(57) ABSTRACT

Co-polyimide membranes for separating components of sour natural gas where embodiments can include at least three distinct moieties polymerized together, the moieties including a 2,2'-bis(3,4-dicarboxyphenyl)hexafluoropropane dianhydride (6FDA) based moiety; a 9,9-bis(4-aminophenyl) fluorene (CARDO) based moiety; and 2,3,5,6-tetramethyl-1,4-phenylenediamine (durene diamine) based moiety.

19 Claims, 6 Drawing Sheets

(56) References Cited

FOREIGN PATENT DOCUMENTS

| | | |
|---|---|---|
| EP | 0407172 A1 | 1/1991 |
| EP | 0627257 A1 | 12/1994 |
| EP | 0811421 A1 | 12/1997 |
| EP | 2471592 A1 | 7/2012 |
| JP | 2007044653 A | 2/2007 |
| WO | 9220431 A1 | 11/1992 |
| WO | 2015091122 A1 | 6/2015 |
| WO | 2017120195 A1 | 7/2017 |

OTHER PUBLICATIONS

C. Wang, et al., Novel Fluorinated Polyimides Derived From 9,9-bis (4-amino-3, 5-difluorophenyl) Fluorene and Aromatic Dianhydrides, Polymer Degradation and Stability 94 (2009) 1746-1753.

Cecopieri-Gomez, On the Limits of Gas Separation in C02/CH4, N2/CH4 and C02/N2 Binary Mixtures Using Polyimide Membranes, Journal of Membrane Science, 293 (2007) pp. 53-65.

Chatterjee, Poly(ether urethane) and poly (ether urethane urea) Membranes With High H2S/CH4 Selectivity, Journal of Membrane Science, 135 (1997), pp. 99-106.

D.M. Amirkhanov, et al., Hollow Fibres for Removal and Concentration of Hydrogen Sulfide From Gas Mixtures by the Membrane Method, Fibre Chemistry, vol. 33, No. 1, 2001.

Heck et al., "Block copolyimide membranes for pure- and mixed-gas separation", Separation and Purification Technology, 2016, pp. 183-192, vol. 173, Elsevier.

J. Hao, et al., Upgrading Low-Quality Natural Gas With H2S- and CO2-Selective Polymer Membranes, Part II. Process Design, Economics, and Sensitivity Study of Membrane Stages With Recycle Streams, Journal of Membrane Science, 320 (2008) 108-122.

J. Vaughn, et al., Effect of Thermal Annealing on a Novel Polyamide-Imide Polymer Membrane for Aggressive Acid Gas Separations, Journal of Membrane Science 401-402 (2012) 163-174.

J. Wind et al., Natural Gas Permeation in Polyimide Membranes, Journal of Membrane Science, 228 (2004) 227-236.

Kim, Relationship Between Gas Separation Properties and Chemical Structure in a Series of Aromatic Polyimides, Journal of Membrane Science, 37 (1988) pp. 45-62.

Kraftschik, Dense Film Polyimide Membranes for Aggressive Sour Gas Feed Separations, Journal of Membrane Science, 428 (2013) pp. 608-619.

M. Chenar, et al., Application of Cardo-type Polyimide (PI) and Polyphenylene Oxide (PPO) Hollow Fiber Membranes in Two-Stage Membrane Systems for Co2/CH4 Separation, Journal of Membrane Science 324 (2008) 85-94.

M. Chenar, et al., Gas Permeation Properties of Commercial Polyphenylene Oxide and Cardo-type Polyimide Hollow Fiber Membranes, Separation and Purification Technology 51(2006) 359-366.

M. Chenar, et al., The Effect of Water Vapor on the Performance of Commercial Polyphenylene Oxide and Pardo-type Polyimide Hollow Fiber Membranes in Co2/CH4 Separation Applications, Journal of Membrane Science 285 (2006) 265-271.

M. Guiver, et al., Structural Characterization and Gas-Transport Properties of Brominated Matrimid Polyimide, Journal of Polymer Science: Part A, Polymer Chemistry, 40 , 4193-4204 (2002).

Mohammadi , Acid Gas Permeation Behavior Through Poly (Ester Urethane Urea) Membrane, Ind. Eng. Chem. Res. 2008, 47, pp. 7361-7367.

Niwa et al., "Preparation of Novel Fluorinated Block Copolyimide Membranes for Gas Separation", Journal of Applied Polymer Science, 2006, pp. 2436-2442, vol. 100, Wiley Periodicals Inc.

S. Kazama et al., Cardo Polyimide Membranes for Co2 Capture From Flue Gases, Greenhouse Gas Control Technologies, vol. 1, E.S. Rubin, D.W. Keith and C.F. Gilbory (Eds) 2005, 75.

Tanis, A Comparison of Homopolymer and Block Copolymer Structure in 6FDA-based Polyimides, Phys. Chem, Chem. Phys. 2014, 16, 23044.

White, Properties of a Polyimide Gas Separation Membrane in Natural Gas Stream, Journal of Membrane Science 101 (1995) pp. 73-82.

Yahaya et al., "Aromatic block co-polyimide membranes for sour gas feed separations", Chemical Engineering Journal, 2016, pp. 1020-1030, vol. 304, Elsevier.

The International Search Report and Written Opinion for related PCT application PCT/US2018/035302 dated Aug. 22, 2018.

A. Alghannam et al., "High pressure pure- and mixed sour gas transport properties of Cardo-type block co-polymide membranes", Journal of Membrane Science, 2018, pp. 32-42, vol. 553, Elsevier B.V.

G. Yahaya et al., "Cardo-type random co-polymide membranes for high pressure pure and mixed sour gas feed separations", Journal of Membranes Science, 2018, pp. 526-535, Elsevier B.V.

CARDO-TYPE CO-POLYIMIDE MEMBRANES FOR SOUR GAS FEED SEPARATIONS FROM NATURAL GAS

PRIORITY

This application is a non-provisional application of and claims priority to and the benefit of U.S. Prov. App. Ser. No. 62/512,822, filed May 31, 2017, which is hereby expressly incorporated herein by reference.

BACKGROUND

Field

Embodiments of the disclosure relate to membranes and separations for hydrocarbons. In particular, embodiments of the disclosure show co-polyimide membranes for sour gas separations relating to natural gas.

Description of the Related Art

In recent years, certain interest in clean energy has increased, and world-wide demand for clean-burning natural gas is also rising. Natural gas consumption is likely to grow at a compounded annual growth rate of about 2.7% from about 2,600 Billion Cubic Meters (BCM) in 2005 to around 3,900 BCM in 2020. Based on 2006 estimates, natural gas has a reserve-to-production ratio of 61 years and a resource-to-production ratio of 133 years.

Raw natural gas varies greatly in composition depending on its extraction origin. Although methane constitutes the key component of raw natural gas, it may also contain considerable amounts of impurities including water, hydrogen sulfide ($H_2S$), carbon dioxide, nitrogen and other hydrocarbons. Natural gas (methane) is a main feedstock for the chemical industry, and with the potential growth in demand for natural gas, separation technologies with high efficiency are required in order to be able to exploit gas fields which are not yet commercially viable because of high contaminant contents.

One step in natural gas treatment involves the removal of acid gases before the gas is delivered to pipelines or stored in portable cylinders as compressed natural gas. At high concentrations, acid gases can corrode transportation pipelines and have numerous other detrimental effects. Moreover, $H_2S$ is toxic and its combustion produces harmful $SO_2$ gas. Thus, sweetening of natural gas (removal of contaminants, such as for example $H_2S$) is needed to reduce pipeline corrosion, prevent atmospheric pollution, increase fuel heating value of natural gas, and decrease the volume of gas to be transported in pipelines and cylinders.

Presently, natural gas treatment and upgrading incorporates industrial gas separation processes. Examples of natural gas treatment technology that have been widely applied include absorption and adsorption of acid gases, such as for example through amine absorption processes and pressure swing adsorption (PSA), respectively. However, conventional technologies are associated with several problems, which include high energy requirements and high capital costs.

The development of membrane materials for sour acid gas separations rarely has been studied. Studies that have been reported include studies on $H_2S/CH_4$ separation performance using rubbery polymeric membranes. However, since rubbery polymeric materials separate based on solubility selectivity, the $CO_2/CH_4$ separation capability of the rubbery polymeric membranes declines sharply and is much lower than other glassy polymers such as cellulose acetate (CA). Furthermore, the mechanical stability of rubbery polymers tends to fall to significantly less than that of glassy polymeric materials.

Glassy polyimide is one type of polymeric membrane that has been investigated for acid gas separations from natural gas. These high glass transition temperature (Tg) (Tg>about 300° C.) materials develop certain acid gas separation capability based on size selectivity. Natural gas is usually treated at high pressures (more than 900 psi) and typically saturated with heavy hydrocarbons ($C_{3+}$) and water vapor.

In order to enhance and optimize polyimide materials for gas separation membranes, further improvement of their properties is required, and this can be achieved by chemical modification of the polymers.

SUMMARY

Applicant has recognized that there is a need for efficient membrane separation apparatus, methods, and systems for selectively separating sour gas and unwanted components from sour natural gas feeds. The disclosure presents apparatus, methods, and systems applying membranes which show efficient, surprising, and unexpected separations of undesirable components from a sour natural gas feed. Unlike conventional technologies, membrane-based separations of the present disclosure do not exhibit drawbacks of conventional technology, as they are much more energy efficient, have less footprint, and are flexible in operation.

In hexafluorodianhydride ("6FDA")-based polyimides, for example produced using 4,4'-(Hexafluoroisopropylidene)diphthalic anhydride, the presence of a $CF_3$ group in the polymer results in chain stiffness, which causes certain membranes incorporating 6FDA to separate molecules based on steric bulk more effectively. The $CF_3$ group also leads to increased permeability due to inhibition of chain packing. As a result, 6FDA-based polyimides can exhibit greater selectivities and greater permeabilities that are within the same order of magnitude when compared to other high-performance polymers. As used herein throughout, the short-hand name of origin monomer units/moieties will be used to refer to final polymerized products, for example 6FDA-durene/CARDO, even though for example certain oxygen atoms of the anhydride groups of 6-FDA have been substituted with nitrogen atoms (see, for example, FIG. 1).

Additionally, gas separation performance of polyimides can be enhanced through copolymerization with other homo-polyimides. Co-polyimides have the advantage of producing membranes with gas permeabilities and selectivities that cannot be obtained with homo-polyimides; and these can be prepared from existing, commercially available materials. In the case of block co-polymers, the properties can be adjusted by changing the length and the ratio of the different blocks. The resulting co-polyimides can significantly improve gas separation properties without the need of heavy and costly synthetic modifications.

The disclosure provides unique materials for gas separation membrane applications, particularly for acid and sour gas feed separations from natural gas. 9,9-bis(4-aminophenyl) fluorene-(CARDO-) type aromatic co-polyimide membranes exhibit excellent pure and gas mixture permeation properties. For pure gas, $CO_2$ permeability is in a range of about 175-239 Barrer and $CO_2/CH_4$ selectivity is up to about 39, obtained at about 35° C. and feed pressures of up to about 400 pounds per square inch (psi). Aromatic polyimides of the present disclosure exhibit advantageous properties such as high thermal stability, mechanical strength, chemical resistance, and resistance to penetrant induced plasticization when compared to cellulose acetate (CA). Membranes fabricated from polyimides have shown remarkable performance, especially high selectivities for $CO_2/CH_4$ separation. Moreover, the permeation of $N_2$ in aromatic polyimides is higher than $CH_4$, and thus at the end of the separation process the natural gas need not be recompressed, which saves energy.

In addition, for sweet gas mixtures, CARDO-type aromatic co-polyimide membranes of the present disclosure show $CO_2$ permeability and $CO_2/CH_4$ selectivity of about 74 Barrer and 31, respectively, for a random co-polyimide 6FDA-durene/CARDO (1:3) (millimoles durene:millimoles CARDO) and show $CO_2$ permeability and $CO_2/CH_4$ selectivity of about 78 Barrer and 26, respectively, for a block co-polyimide (6FDA-durene)/(6FDA-CARDO) (5000)/(5000) at an elevated pressure of 800 psi. In case of high content of sour gas mixtures (about 20 vol. % $H_2S$ in the feed gas), the CARDO-type aromatic co-polyimide membranes show $CO_2/CH_4$ and $H_2S/CH_4$ ideal selectivities in the range of about 18-23 and 19-21, respectively, and $CO_2$ and $H_2S$ permeabilities in the range of 38-51 Barrer and 40-47 Barrer, respectively. Membrane materials of the present disclosure exhibit excellent stability at moderate pressures and high $H_2S$ concentrations. Unless specified otherwise, throughout the disclosure ratios such as (x:y) refer to (millimoles durene:millimoles second monomer unit).

Aromatic co-polyimide membranes of the present disclosure can be synthesized from a wide range of monomers including and not limited to 4,4'-(hexafluoroisopropylidene) diphthalic dianhydride, also known as 2,2'-bis(3,4-dicarboxyphenyl)hexafluoropropane dianhydride (6FDA); 9,9-bis(4-aminophenyl) fluorene (CARDO); and 2,3,5,6-tetramethyl-1,4-phenylenediamine (durene). The polymerization of the aforementioned monomers can form random polymers and block co-polymers, for example with different block lengths of (6FDA-durene)/(6FDA-CARDO) co-polyimides. To enhance separation performance and optimize co-polyimides for gas separation, chemical modifications including substitution of other pertinent moieties and bulky functional groups in the co-polyimides backbone can be carried out.

Unique modification steps significantly improve the performance of the co-polyimides. In some other embodiments, the development of aromatic co-polyimides can also be considered from other monomers with and without, or in the absence of, crosslinking. Example monomers include 4,4'-methylene-bis(2,6-diethylaniline) (MDEA); 9,9-bis(4-aminophenyl-3-isopropyl-5-methylphenyl) fluorene (alkyl substituted CARDO); 4,4'-Diaminodiphenylmethane (MDA); 2,2'-Bis(trifluoromethyl)benzidine (TFMB); 4,4'-Diaminooctafluorobiphenyl; 4,4'-Diaminobiphenyl; 2,3,5,6-Tetrafluoro-1,4-phenylenediamine; and combinations thereof. Those of ordinary skill in the art will realize additional monomers could be used in embodiments of the disclosure.

Examples include forming such co-polymers as 6FDA-durene/CARDO (3:1) (millimoles durene:millimoles CARDO); 6FDA-durene/CARDO (1:1); 6FDA-durene/CARDO (1:3); block (6FDA-durene)/(6FDA-CARDO) (1,000-20,000)/(1,000-20,000); 6FDA-durene/alkyl substituted CARDO (3:1); 6FDA-durene/alkyl substituted CARDO (1:1); 6FDA-durene/alkyl substituted CARDO (1:3); block (6FDA-durene)/(6FDA-alkyl substituent CARDO) (1,000-20,000)/(1,000-20,000); 6FDA-durene/MDEA (3:1); 6FDA-durene/MDEA (1:1); 6FDA-durene/MDEA (1:3); block (6FDA-durene)/(6FDA-MDEA) (1,000-20,000)/(1,000-20,000); and combinations thereof.

Crosslinking of the polymers can be achieved using different types and sizing of functional groups. Examples include and are not limited to functionalization or grafting with polar or $H_2S$-philic, in addition to or alternative to $CO_2$-philic, groups that include Bromine (Br); sulfonic acid ($SO_3H$); diallyl amine; acrylonitrile; jeffamines; and combinations thereof. Crosslinking can also be achieved using such cross-linkers as N,N-dimethylpiperizine, p-xylenediamine, m-xylenediamine, aliphatic diamine, polyethyleneimine, 1,3-cyclohexane-bis(methylamine), and combinations thereof, for example.

CARDO diamine monomers can be used to introduce fluorenyl units into polyimide backbones of polymer units. The use of different block sizes and ratios allows unique combinations of polymers which have improved performance in membrane separations.

Therefore, disclosed here is a membrane for separating the components of a sour natural gas feed, the membrane including at least three distinct moieties polymerized together, the moieties including a 2,2'-bis(3,4-dicarboxyphenyl)hexafluoropropane dianhydride (6FDA) based moiety; a 9,9-bis(4-aminophenyl) fluorene (CARDO) based moiety; and 2,3,5,6-tetramethyl-1,4-phenylenediamine (durene diamine) based moiety. In some embodiments, the membrane comprises random co-polymers. In other embodiments, the molar ratio of the durene diamine based moiety to the CARDO based moiety is about 3:1. Still in other embodiments, the molar ratio of the durene diamine based moiety to the CARDO based moiety is about 1:1. In yet other embodiments, the molar ratio of the durene diamine based moiety to the CARDO based moiety is about 1:3.

In certain embodiments, the membrane comprises block co-polymers. In some embodiments, the block co-polymers include a polymer block L of the 6FDA and the durene diamine based moiety, and include a polymer block M of the 6FDA and the CARDO based moiety, and a block ratio of L to M is about between (1,000-20,000) to (1,000-20,000). Still in other embodiments, the block ratio of L to M is about (2,500) to (2,500). In some embodiments, the block ratio of L to M is about (5,000) to (5,000). In certain embodiments, the block ratio of L to M is about (15,000) to (15,000).

Additionally disclosed herein is a method of gas separation, the method including applying at least one membrane of the present disclosure to separate at least 2 components of a mixed gas stream. Additionally disclosed herein is a method for making a membrane for separating components of a sour natural gas feed, the method including combining at least three different monomers to form a co-polyimide, the monomers including 2,2'-bis(3,4-dicarboxyphenyl)hexafluoropropane dianhydride (6FDA); 9,9-bis(4-aminophenyl) fluorene (CARDO); and 2,3,5,6-tetramethyl-1,4-phenylenediamine (durene); and preparing a dense film from the co-polyimide using a solution casting process.

Some embodiments of the methods further include the step of using the dense film to separate components of a gas stream. In some embodiments, the three different monomers are combined to create random co-polymers. In some embodiments, the molar ratio of the durene diamine to the CARDO is about 3:1. In other embodiments, the molar ratio of the durene diamine to the CARDO is about 1:1. Still in other embodiments, the molar ratio of the durene diamine to the CARDO is about 1:3. In yet other embodiments, the three different monomers are combined to create block co-polymers. Still in other embodiments, the block co-polymers include a polymer block L of the 6FDA and the durene diamine and include a polymer block M of the 6FDA and the CARDO, and a block ratio of L to M is about between (1,000-20,000) to (1,000-20,000).

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
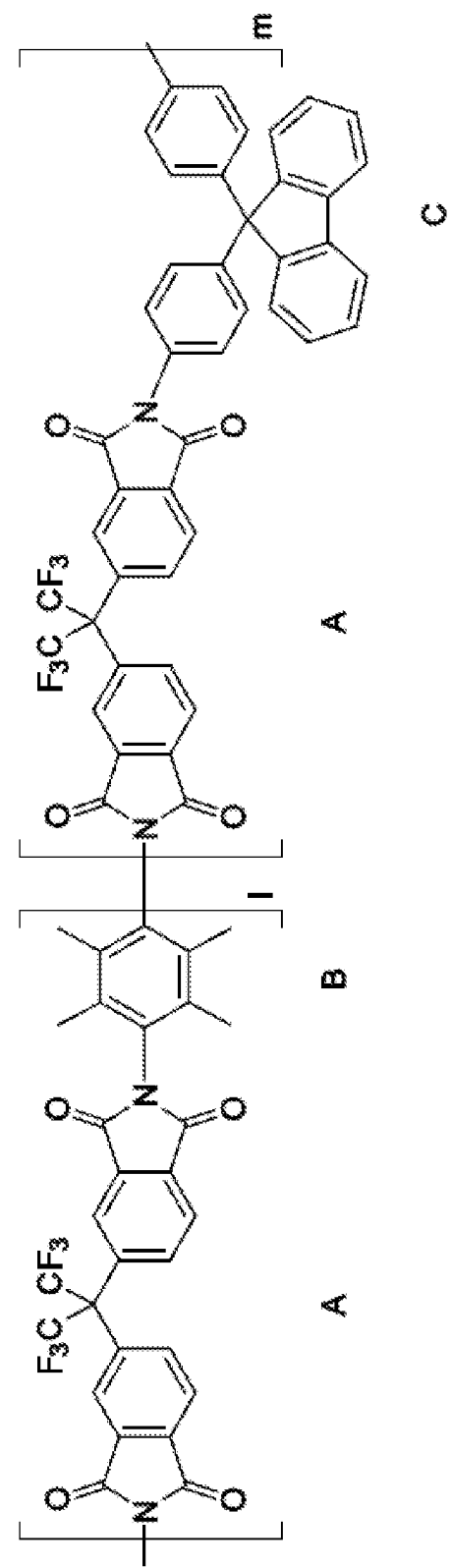
FIG. 1 is a molecular representation of a (6FDA-durene)/(6FDA-CARDO) block co-polyimide.

So that the manner in which the features and advantages of the embodiments of the apparatus, systems, and methods for CARDO-type co-polyimide membranes for sour gas feed separations from natural gas, as well as others, which will become apparent, may be understood in more detail, a more particular description of the embodiments of the present disclosure briefly summarized previously may be had by reference to the various embodiments, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

The present disclosure includes membranes and methods of use for gas separation applications, particularly for sour gas feed separations from natural gas using 9,9-bis(4-aminophenyl) fluorene-(CARDO) type aromatic co-polyimide membranes that exhibit excellent pure and mixed-gas permeation and selectivity properties. Aromatic co-polyimide membranes (random and block) can be developed from a wide range of monomers including 4,4'-(hexafluoroisopropylidene) diphthalic dianhydride, also known as 2,2'-bis(3,4-dicarboxyphenyl)hexafluoropropane dianhydride (6FDA); CARDO; and 2,3,5,6-tetramethyl-1,4-phenylenediamine (durene) forming random co-polyimides and different block lengths of (6FDA-durene)/(6FDA-CARDO) block co-polyimides.

In order to enhance the separation performance even further and optimize co-polyimides for gas separation, chemical modifications can be made, which include substitution of other pertinent moieties and bulky functional groups in the co-polyimide backbone. These modification steps can significantly improve the performance of co-polyimide membranes. Thus, the development of aromatic co-polyimides can be considered from other monomers with and without, or in the absence of, crosslinking.

Monomers include 4,4'-methylene-bis(2,6-diethylaniline) (MDEA); 9,9-bis(4-aminophenyl-3-isopropyl-5-methylphenyl) fluorene (alkyl substituted CARDO); 4,4'-Diaminodiphenylmethane (MDA); 2,2'-Bis(trifluoromethyl)benzidine (TFMB); 4,4'-Diaminooctafluorobiphenyl; 4,4'-Diaminobiphenyl; and 2,3,5,6-Tetrafluoro-1,4-phenylenediamine forming such copolymers as 6FDA-durene/CARDO (3:1) (millimoles durene:millimoles CARDO); 6FDA-durene/CARDO (1:1); 6FDA-durene/CARDO (1:3); block (6FDA-durene)/(6FDA-CARDO) (1,000-20,000)/(1,000-20,000); 6FDA-durene/alkyl substituted CARDO (3:1); 6FDA-durene/alkyl substituted CARDO (1:1); 6FDA-durene/alkyl substituted CARDO (1:3); block (6FDA-durene)/(6FDA-alkyl substituted CARDO) (1,000-20,000)/(1,000-20,000); 6FDA-durene/MDEA (3:1); 6FDA-durene/MDEA (1:1); 6FDA-durene/MDEA (1:3); block (6FDA-durene)/(6FDA-MDEA) (1,000-20,000)/(1,000-20,000); and combinations thereof.

Crosslinking of example polymers can be achieved using different types and sizes of functional groups. These include and are not limited to functionalization or grafting with polar or $H_2S$-philic/$CO_2$-philic groups that include Bromine (Br); sulfonic acid ($SO_3H$); diallyl amine; acrylonitrile; Jeffamines, and combinations thereof. Crosslinking can be carried out using such cross-linkers as N,N-dimethylpiperizine, p-xylenediamine, m-xylenediamine, aliphatic diamine, polyethyleneimine, 1,3-cyclohexane-bis(methylamine), and combinations thereof, for example.

Gas permeation through a dense polymer membrane is governed by the expression in Equation (1):

$$j_i = \frac{D_i S_i (p_{i0} - p_{i1})}{l} \qquad \text{Eq. 1}$$

where $j_i$ is the volumetric flux of component i expressed as $(cm^3 (STP))/(cm^2 \cdot s)$, l is the membrane thickness (cm), $p_{i0}$ is the partial pressure of component i on the feed side, and $p_{i1}$ is the partial pressure of component i on the permeate side. The diffusion coefficient, $D_i$, reflects the mobility of the individual molecules in the membrane material ($cm^2/s$); the gas sorption coefficient, $S_i$, reflects the amount of molecules dissolved in the membrane material. In a Fickian mechanism, the product $D_i S_i$ is a measure of the membrane's ability to permeate gas, and can be written as $P_i$, which is called the membrane permeability.

An important property of a membrane is its ability to achieve the separation of two (or more) different gaseous penetrants. This is the permselectivity, $a_{ij}$. It is represented as shown in Eq. 2:

$$\alpha_{ij} = \frac{p_i}{p_j} = \frac{S_i}{S_j} \times \frac{D_i}{D_j} \qquad \text{Eq. 2}$$

Thus, the selectivity of a membrane to the penetrants i and j is the ratio of $P_i/P_j$ which, in turn, is the product of the solubility selectivity $S_i/S_j$ and the diffusion selectivity $D_i/D_j$. In the case of glassy amorphous polymers and for gases at greater than their critical temperature, $T_c$, it has been found that the permselectivity is primarily controlled by the diffusion selectivity ($D_i/D_j$). The diffusion coefficient D is calculated by Eq. 3:

$$D = \frac{l^2}{6\theta} \quad \text{Eq. 3}$$

where l (cm) is the thickness of the membrane and θ is the time-lag.

Generally, permeation of a gas through dense polymeric membranes is considered as an activated process, which can usually be represented or described by the Van't Hoff-Arrhenius types of equations. This implies that temperature may have a large effect on transport rates. Thus, the effect of temperature on gas solubility, diffusivity and permeability is often described using Van't Hoff-Arrhenius approach. Equations 4, 5, and 6 are as follows:

$$S = S_0 \exp\left(\frac{-\Delta H_s}{RT}\right) \quad \text{Eq. 4}$$

$$D = D_0 \exp\left(\frac{-E_d}{RT}\right) \quad \text{Eq. 5}$$

$$P = P_0 \exp\left(\frac{-E_p}{RT}\right) \quad \text{Eq. 6}$$

where $P_o$ (Barrer), $S_o$ ($cm^3$(STP))/($cm^3 \cdot cm \cdot Hg$) and $D_o$ ($cm^2$/sec) are pre-exponential factors, R is the universal gas constant (8.314×10$^{-3}$ kJ/mol·K), T is the absolute temperature (K), and $E_p$, $\Delta H_s$, and $E_D$ are the activation energy of permeation, the enthalpy of sorption or heat of solution, and the activation energy of diffusion, respectively (kJ/mol).

Transport of gases in polymers is also affected by variation in feed pressures. Changes in gas permeability as a function of pressure in glassy polymers is often explained using a dual-mode model and partial immobilization models. In general, the Langmuir model, which is associated with the "excess" free volume formed in the glassy state, makes a large contribution to the pressure dependence on the permeability in glassy polymers. Moreover, decrease of gas permeability at high pressure is possible, and due at least in part to a decrease of the material free volume in these conditions.

Embodiments which follow show the preparation of CARDO-type co-polyimides (random and block) made from 6FDA, durene and CARDO moieties. In addition, certain embodiments are aimed at achieving enhancement in gas separation properties. Physical and gas transport properties of CARDO-type co-polyimides are examined by investigating properties of pure and mixed sour gas consisting of $H_2S$, $CO_2$, $CH_4$, $N_2$ and $C_2H_6$ permeating through the dense films of the co-polyimides, including (6FDA-durene)/(6FDA-CARDO), for simultaneous separation of $CO_2$, $H_2S$ and $N_2$ from sour gas streams. The $H_2S$ composition in the gas mixture is up to 36 vol. % and feed gas pressure and operating temperature are up to 800 psi and 55° C., respectively.

EXAMPLES

The following examples are given for the purpose of illustrating embodiments of the invention, however, it is to be understood that these examples are merely illustrative in nature, and that the embodiments of the present invention are not necessarily limited thereto.

Example 1: Preparation of Aromatic Co-Polyimide Dense Film Membranes as Random 6FDA-Durene/CARDO and Block (6FDA-Durene)/(6FDA-CARDO)

FIG. 1 is a molecular representation of a block (6FDA-durene)/(6FDA-CARDO) co-polyimide. For example, in FIG. 1, A refers to the polymerized 6FDA moiety, B refers to the polymerized durene moiety, and C refers to the polymerized CARDO moiety. Aromatic 6FDA-durene/CARDO co-polyimides, (a block example being shown in FIG. 1), were synthesized according to the following procedures from 2,2'-bis-(3,4'-dicarboxyphenyl) hexafluoropropane dianhydride (6FDA) (obtained from Aldrich); 2,3,5,6-tetramethyl-1,4-,phenylenediamine (durene diamine) (obtained from Aldrich); and 9,9-bis(4-aminophenyl) fluorene (CARDO) (obtained from Aldrich). Methanol and m-cresol (obtained from Aldrich) were used as solvents as received. In block co-polyimides of the present disclosure (l)/(m) in FIG. 1 can be about between (1,000-20,000)/(1,000-20,000).

A random co-polyimide 6FDA-durene/CARDO (3:1) (millimoles durene:millimoles CARDO) was synthesized as follows: In a three-neck round bottom flask equipped with a nitrogen inlet and a mechanical stirrer, 2.7730 g (16.883 mmol) of durene diamine and 1.9609 g (5.628 mmol) of CARDO were dissolved in 17 ml of m-cresol. Then 10 g (22.51 mmol) of 6FDA was added with 16 ml of m-cresol. The mixture was heated at 180° C. for 8 hours. The solution was diluted progressively during the reaction by the addition of 24 ml of m-cresol. After cooling, the resulting highly viscous solution was poured into methanol. The fibrous polymer obtained was ground, rinsed with methanol, filtered and dried under reduced pressure for 24 h at 60° C.

A random co-polyimide 6FDA-durene/CARDO (1:1) was synthesized as follows: In a three-neck round bottom flask equipped with a nitrogen inlet and a mechanical stirrer, 1.8487 g (11.255 mmol) of durene diamine and 3.9219 g (11.255 mmol) of CARDO were dissolved in 18 ml of m-cresol. Then 10 g (22.51 mmol) of 6FDA was added with 18 ml of m-cresol. The mixture was heated at 180° C. for 8 hours. The solution was diluted progressively during the reaction by the addition of 25 ml of m-cresol. After cooling, the resulting highly viscous solution was poured into methanol. The fibrous polymer obtained was ground, rinsed with methanol, filtered and dried under reduced pressure for 24 h at 60° C.

A random co-polyimide 6FDA-durene/CARDO (1:3) was synthesized as follow: In a three-neck round bottom flask equipped with a nitrogen inlet and a mechanical stirrer, 0.9243 g (5.628 mmol) of durene diamine and 5.8828 g (16.883 mmol) of CARDO were dissolved in 19 ml of m-cresol. Then, 10 g (22.51 mmol) of 6FDA was added with 19 ml of m-cresol. The mixture was heated at 180° C. for 8 hours. The solution was diluted progressively during the reaction by the addition of 27 ml of m-cresol. After cooling, the resulting highly viscous solution was poured into methanol. The fibrous polymer obtained was ground, rinsed with methanol, filtered and dried under reduced pressure for 24 h at 60° C.

A block co-polyimide (6FDA-durene)/(6FDA-CARDO) (2500)/(2500) was synthesized as follows: In a three-neck round bottom flask equipped with a nitrogen inlet and a mechanical stirrer, 5.2267 g (15 mmol) of CARDO was dissolved in 11 ml of m-cresol, then 4.6703 g (10.513 mmol) of 6FDA was added with 11 ml of m-cresol. The mixture was heated at 180° C. for 8 hours. Then, the solution was diluted progressively by the addition of 16 ml of m-cresol. After that, the mixture was cooled to room temperature, and 2.2777 g (13.868 mmol) of durene diamine, 8.1536 g (18.354 mmol) of 6FDA and 24 ml of m-cresol were added. The mixture was heated again at 180° C. during 8 hours. The solution was diluted during the reaction by the addition of 16 ml of m-cresol. After cooling, the resulting highly viscous solution was poured into methanol. The fibrous polymer obtained was ground, rinsed with methanol, filtered and dried under reduced pressure for 24 h at 60° C.

A block co-polyimide (6FDA-durene)/(6FDA-CARDO) (5000)/(5000) was synthesized as follows: In a three-neck round bottom flask equipped with a nitrogen inlet and a mechanical stirrer, 5.2267 g (15 mmol) of CARDO was dissolved in 13 ml of m-cresol, then 5.6612 g (12.744 mmol) of 6FDA was added with 12 ml of m-cresol. The mixture was heated at 180° C. for 8 hours. Then the solution was diluted progressively by the addition of 17 ml of m-cresol. After that, the mixture was cooled to room temperature and 2.7642 g (16.829 mmol) of durene diamine, 8.4787 g (19.086 mmol) of 6FDA and 25 ml of m-cresol were added. The mixture was heated again at 180° C. for about 8 hours. The solution was diluted during the reaction by the addition of 18 ml of m-cresol. After cooling, the resulting highly viscous solution was poured into methanol. The fibrous polymer obtained was ground, rinsed with methanol, filtered and dried under reduced pressure for 24 h at 60° C.

A block co-polyimide (6FDA-durene)/(6FDA-CARDO) (15,000)/(15,000) was synthesized as follows: In a three-neck round bottom flask equipped with a nitrogen inlet and a mechanical stirrer, 5.2267 g (15 mmol) of CARDO was dissolved in 13 ml of m-cresol, then 6.3282 g (14.245 mmol) of 6FDA was added with 13 ml of m-cresol. The mixture was heated at 180° C. for 8 hours. Then the solution was diluted progressively by the addition of 19 ml of m-cresol. After that, the mixture was cooled to room temperature and 3.0918 g (18.824 mmol) of durene diamine, 8.6977 g (19.578 mmol) of 6FDA and 27 ml of m-cresol were added. The mixture was heated again at 180° C. during 8 hours. The solution was diluted during the reaction by the addition of 19 ml of m-cresol. After cooling, the resulting highly viscous solution was poured into methanol. The fibrous polymer obtained was ground, rinsed with methanol, filtered and dried under reduced pressure for 24 h at 60° C.

Figure 2:
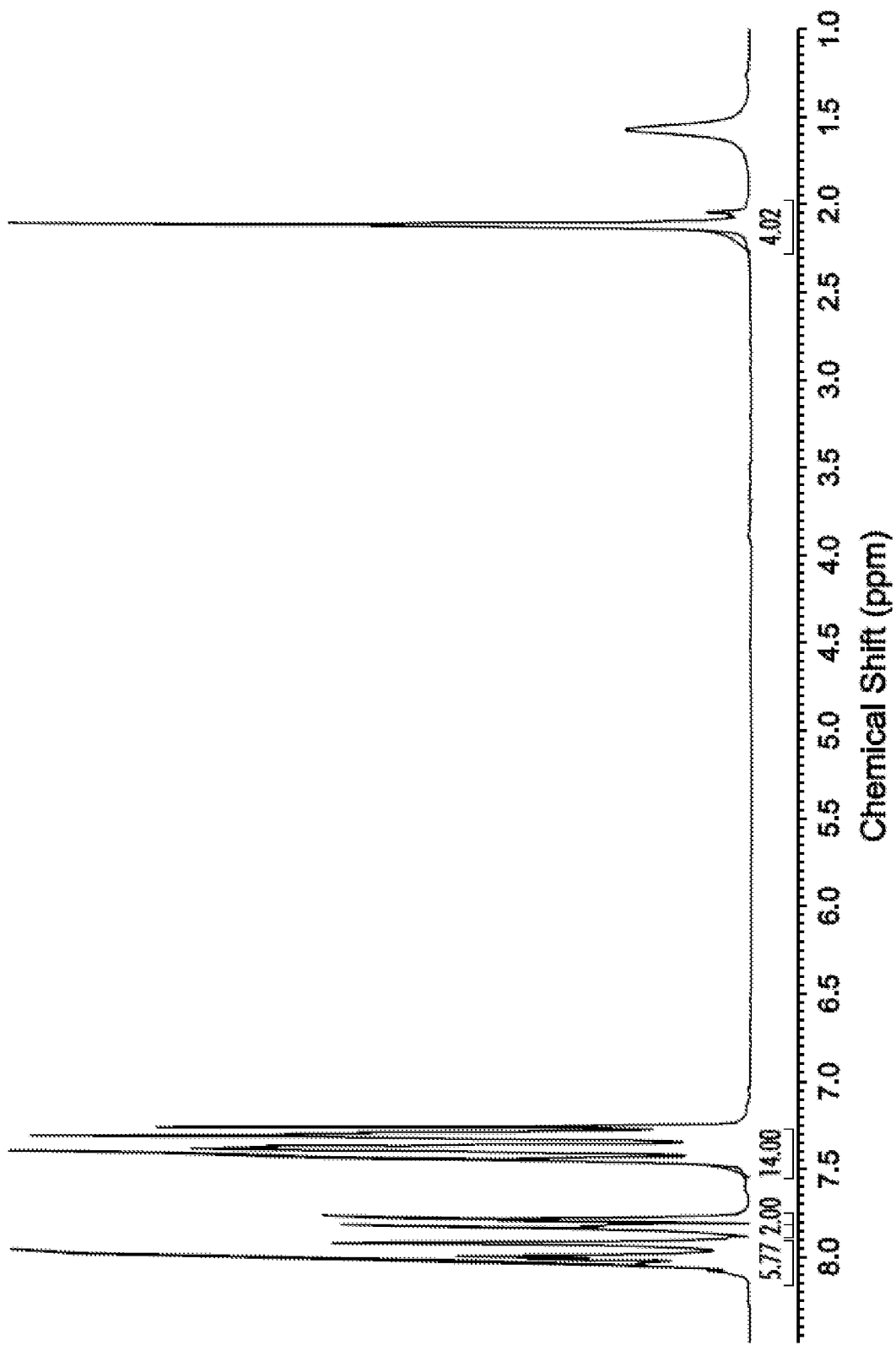
FIG. 2 is a graph showing a $^1$H nuclear magnetic resonance (NMR) spectrum for a 6FDA-durene/CARDO co-polyimide.

Referring now to FIG. 2, a graph is provided showing a $^1$H nuclear magnetic resonance (NMR) spectrum for a 6FDA-durene/CARDO co-polyimide. FIG. 2 shows a spectrum of the obtained 6FDA-durene/CARDO copolymer. The peaks in the range of 8.10-7.90 ppm are assigned to the protons of aromatic 6FDA; the peaks in the range of 7.50-7.27 ppm are assigned to protons of aromatic CARDO; and the peak at 2.14 ppm is assigned to the $CH_3$ groups of durene. This confirms the incorporation of all units in the CARDO-type 6FDA polyimides.

Figure 3:
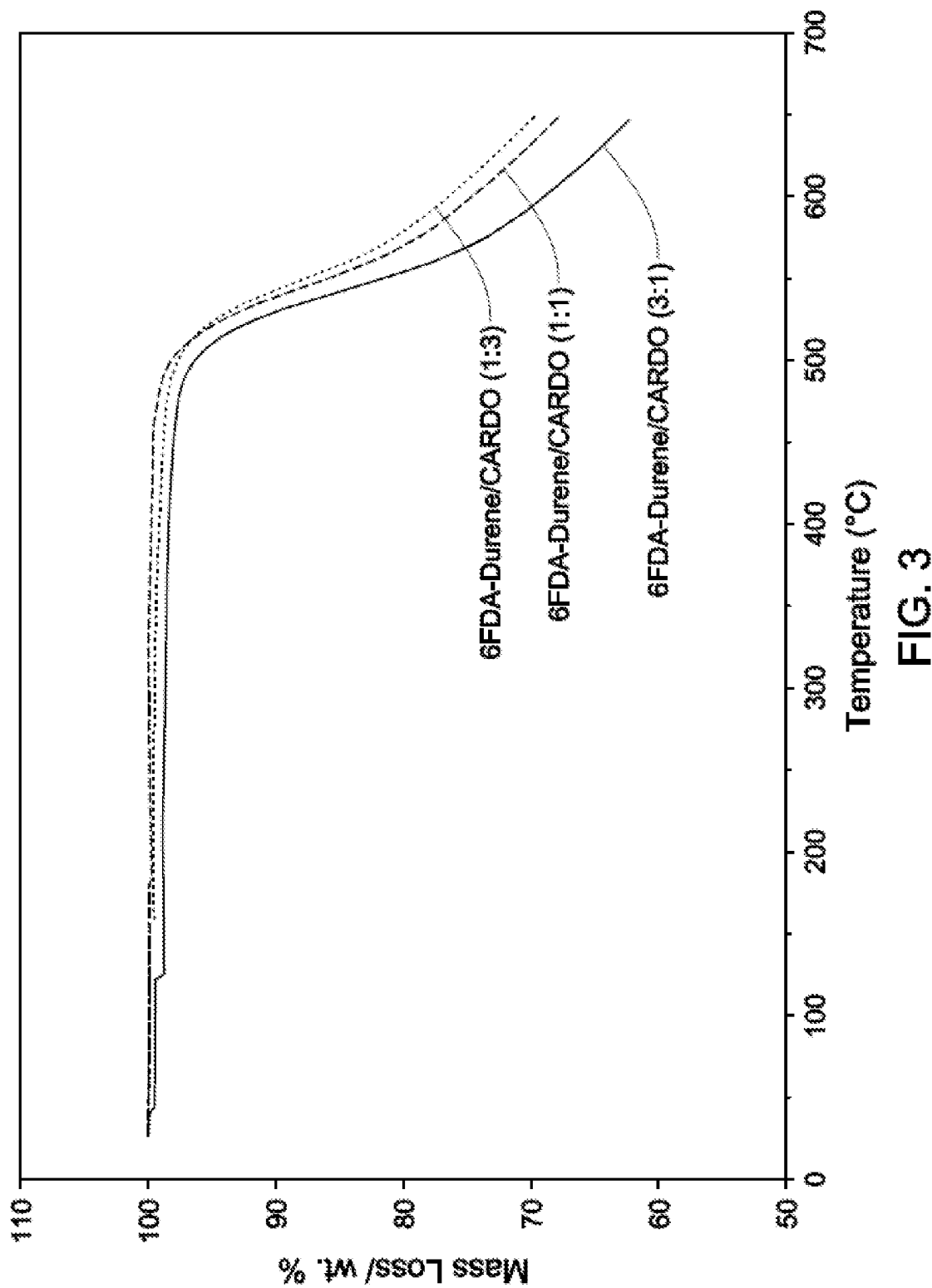
FIG. 3 is a graph showing thermogravimetric analysis (TGA) of 6FDA-durene/CARDO random co-polyimides.

Referring now to FIG. 3, a graph is provided showing thermogravimetric analysis (TGA) of 6FDA-durene/CARDO random co-polyimides of different ratios of millimoles durene:millimoles CARDO. Thermogravimetric analysis was used to study the thermal stability of the prepared co-polyimides. FIG. 3 shows TGA curves obtained for the synthesized polymers. The temperatures ($T_d$) at 5% weight loss in nitrogen are shown in Table 1. The results show that all synthesized co-polyimides have a very good thermal stability of up to about 500° C. The glass transition temperature ($T_g$) of the synthesized polymers was determined by differential scanning calorimetry (DSC) and is also shown in Table 1. $T_g$ is an indicator of the cooperative motion of polymeric chains.

TABLE 1

Thermal and physical properties of the synthesized CARDO-type 6FDA co-polyimides.

| Co-polyimide | Type | $T_d$ at 5% weight loss ($N_2$) (° C.) | $T_g$ (° C.) |
|---|---|---|---|
| 6FDA-Durene/CARDO (3:1) | Random co-polyimide | 514.7 | 343.61 |
| 6FDA-Durene/CARDO (1:1) | Random co-polyimide | 526.4 | 341.31 |
| 6FDA-Durene/CARDO (1:3) | Random co-polyimide | 527.3 | 381.0 |
| (6FDA-Durene)/(6FDA-CARDO) (2,500)/(2,500) | Block co-polyimide | 512.0 | 377.0 |
| (6FDA-Durene)/(6FDA-CARDO) (5,000)/(5,000) | Block co-polyimide | 519.3 | 382.25 |
| (6FDA-Durene)/(6FDA-CARDO) (15,000)/(15,000) | Block co-polyimide | 523.6 | 341.31 |

The co-polyimide dense film membranes were prepared as follows: Dense films were prepared by a solution casting method. About 2 to 3 weight % polymer solutions in chloroform were filtered through a 0.45 μm filter to remove any non-dissolved materials and dust particles. The solution was then cast on a dry clean petri dish and left to evaporate at room temperature under a clean nitrogen enriched atmosphere overnight. The film was then slowly heated in an oven under a slow nitrogen flow to about 60° C. for about 24 hours. Afterwards, the film was left in the oven under vacuum at 60° C. for another 24 hours. The resulting film was finally dried in a vacuum oven at 150° C. overnight to remove any residual solvent.

Example 2: Evaluation of the $CO_2/CH_4$; $He/CH_4$; and $N_2/CH_4$ Pure Gas Separation Performance of Random 6FDA-Durene/CARDO and Block (6FDA-Durene)/(6FDA-CARDO) Membranes Prepared in Example 1

The permeability coefficients of pure gases He, $CO_2$, $CH_4$, and $N_2$; and $He/CH_4$, $N_2/CH_4$; and $CO_2/CH_4$ selectivities through different random 6FDA-durene/CARDO and multi-block co-polyimide (6FDA-durene)/(6FDA-CARDO) at an upstream pressure of up to 400 psi and at 35° C. were studied and results are shown in Tables 2-4. For the random co-polyimides, the content of CARDO in the copolymer of CARDO and durene was varied from about 25 mol. % to about 75 mol. % in order to see the effect of this variation in permeation properties of the copolymer. As the CARDO content increases, the penetrants permeabilities decrease, while the selectivities, especially $CO_2/CH_4$ and $He/CH_4$ increase. The optimum values of $CO_2$ and He permeabilities are 102.1 Barrer and 90.4 Barrer, respectively, and $CO_2/CH_4$ and $He/CH_4$ selectivities of 35.18 and 39.73 respectively were obtained for a random copolymer 6FDA-durene/CARDO (1:3) (Table 2-3).

TABLE 2

Pure gas permeability and selectivity coefficients in the random 6FDA-durene/CARDO and block co-polyimide (6FDA-durene)/(6FDA-CARDO) membranes measured at 100 psi feed pressure and at 35° C.

| Co-polyimide | Type | Permeability, Barrer | | | | Selectivity | | |
|---|---|---|---|---|---|---|---|---|
| | | $N_2$ | $CH_4$ | He | $CO_2$ | $N_2/CH_4$ | $He/CH_4$ | $CO_2/CH_4$ |
| 6FDA-Durene/CARDO (3:1) | Random co-polyimide | 20.0 | 16.1 | 261.6 | 323 | 1.24 | 16.25 | 20.06 |
| 6FDA-Durene/CARDO (1:1) | Random co-polyimide | 10.2 | 8.86 | 192.8 | 196 | 1.15 | 21.76 | 22.07 |
| 6FDA-Durene/CARDO (1:3) | Random co-polyimide | 3.76 | 2.57 | 102.1 | 90.4 | 1.46 | 39.73 | 35.18 |
| (6FDA-Durene)/(6FDA-CARDO) (15,000)/(15,000) | Block co-polyimide | 9.92 | 7.61 | 173.3 | 181 | 1.30 | 22.77 | 23.78 |
| (6FDA-Durene)/(6FDA-CARDO) (5,000)/(5,000) | Block co-polyimide | 6.53 | 4.85 | 159.6 | 175 | 1.35 | 32.91 | 36.08 |
| (6FDA-Durene)/(6FDA-CARDO) (2,500)/(2,500) | Block co-polyimide | 12.65 | 8.60 | 214.1 | 238.8 | 1.471 | 24.89 | 27.77 |

TABLE 3

Pure gas permeation properties of random co-polyimide 6FDA-durene/CARDO (1:3) membranes at different pressures and at 35° C.

| Pressure | Permeability (Barrer) | | | | Selectivity | | |
|---|---|---|---|---|---|---|---|
| (psi) | $CO_2$ | $CH_4$ | He | $N_2$ | $CO_2/CH_4$ | $He/CH_4$ | $N_2/CH_4$ |
| 100 | 90.35 | 2.57 | 102.2 | 3.76 | 35.16 | 39.75 | 1.46 |
| 200 | 97.00 | 2.54 | 100.0 | 3.76 | 38.26 | 39.46 | 1.48 |
| 300 | 103.5 | 2.48 | 103.0 | 3.74 | 41.82 | 41.62 | 1.51 |
| 400 | 110.0 | 2.58 | 104.2 | 3.76 | 42.64 | 40.37 | 1.46 |

TABLE 4

Pure gas permeation properties of block co-polyimide (6FDA-durene)/(6FDA-CARDO) (5,000)/(5,000) membranes at different pressures and at 35° C.

| Pressure | Permeability (Barrer) | | | | Selectivity | | |
|---|---|---|---|---|---|---|---|
| (psi) | $CO_2$ | $CH_4$ | He | $N_2$ | $CO_2/CH_4$ | $He/CH_4$ | $N_2/CH_4$ |
| 100 | 175.0 | 4.9 | 159.6 | 6.5 | 36.08 | 32.90 | 1.35 |
| 200 | 186.0 | 5.1 | 160.5 | 7.0 | 36.61 | 31.58 | 1.38 |
| 300 | 201.0 | 5.0 | 161.5 | 7.2 | 40.20 | 32.29 | 1.44 |
| 400 | — | 4.8 | 162.5 | 7.1 | — | 34.19 | 1.48 |

For the multi-block co-polyimides, the block length and ratio was varied from (2,500)/(2,500) to (15,000)/(15,000) in order to see the effect of this variation in permeation properties of the co-polymers. As can be observed, all the penetrants permeabilities decrease, while the selectivities, especially $CO_2/CH_4$ and $He/CH_4$ increase as the block ratio decreased from (15,000)/(15,000) to (5,000)/(5,000). However further decrease in the block ratio to (2,500)/(2,500) led to an increase in all the penetrants permeability and slight decrease in selectivities. Thus optimum values of $CO_2$ and He permeabilities of 175 Barrer and 159.6 Barrer, respectively, and $CO_2/CH_4$ and $He/CH_4$ selectivities of 36.08 and 32.91, respectively, were obtained for a block copolymer (6FDA-durene)/(6FDA-CARDO) (5,000)/(5,000) (Tables 2-4).

In this pure gas study, $CO_2$ permeability and $CO_2/CH_4$ selectivity are in the range of 175-239 Barrer and 28-36 respectively (Table 2), which are comparable to and even much better than other high-performance polymeric membranes that have been reported.

Example 3: Evaluation of the $CO_2/CH_4$; $N_2/CH_4$; and $C_2H_6/CH_4$ Mixed Gas Separation Performance of Random 6FDA-Durene/CARDO and Block (6FDA-Durene)/(6FDA-CARDO) Membranes Prepared in Example 1

The permeability properties of quaternary gas mixtures consisting of 10; 59; 30; and 1 volume percent $CO_2$, $CH_4$, $N_2$ and $C_2H_6$, respectively, passing through the co-polyimide membranes were studied at different upstream pressures and are summarized in Tables 5 and 6. $CO_2$ permeability and $CO_2/CH_4$ selectivity reduced to about 74 Barrer and 31, respectively, for random co-polyimide 6FDA-Durene/CARDO (1:3) and 78 Barrer, and 26, respectively, for the block co-polyimide (6FDA-durene)/(6FDA-CARDO) (5,000)/(5,000) at an elevated pressure of 800 psi.

TABLE 5

Mixed gases permeability and selectivity coefficients in the random co-polyimide 6FDA-durene/CARDO (1:3) membrane as function of feed pressure at 22° C. using a gas mixture containing 10; 59; 30 and 1 vol. % of $CO_2$, $CH_4$, $N_2$ and $C_2H_6$, respectively.

| Pressure | Permeability (Barrer) | | | | Ideal selectivity | | |
|---|---|---|---|---|---|---|---|
| (psi) | $CO_2$ | $CH_4$ | $N_2$ | $C_2H_6$ | $CO_2/CH_4$ | $N_2/CH_4$ | $C_2H_6/CH_4$ |
| 200 | 158.85 | 2.58 | 2.00 | 2.62 | 61.62 | 0.78 | 1.02 |
| 300 | 119.83 | 2.39 | 1.55 | 2.30 | 50.22 | 0.65 | 0.96 |

TABLE 5-continued

Mixed gases permeability and selectivity coefficients in the random co-polyimide 6FDA-durene/CARDO (1:3) membrane as function of feed pressure at 22° C. using a gas mixture containing 10; 59; 30 and 1 vol. % of $CO_2$, $CH_4$, $N_2$ and $C_2H_6$, respectively.

| Pressure | Permeability (Barrer) | | | | Ideal selectivity | | |
|---|---|---|---|---|---|---|---|
| (psi) | $CO_2$ | $CH_4$ | $N_2$ | $C_2H_6$ | $CO_2/CH_4$ | $N_2/CH_4$ | $C_2H_6/CH_4$ |
| 400 | 95.44 | 2.30 | 1.79 | 2.08 | 41.55 | 0.78 | 0.90 |
| 500 | 89.35 | 2.36 | 1.98 | 2.00 | 37.91 | 0.84 | 0.85 |
| 600 | 83.00 | 2.43 | 2.10 | 1.91 | 34.15 | 0.86 | 0.79 |
| 700 | 79.30 | 2.43 | 2.19 | 1.99 | 32.64 | 0.90 | 0.82 |
| 800 | 74.02 | 2.35 | 2.18 | 1.88 | 31.46 | 0.93 | 0.80 |

TABLE 6

Mixed gases permeability and selectivity coefficients in the block co-polyimide (6FDA-durene)/(6FDA-CARDO) (5,000)/(5,000) membrane as function of feed pressure at 22° C. using gas mixture containing 10, 59, 30, and 1 volume percent of $CO_2$, $CH_4$, $N_2$, and $C_2H_6$ respectively.

| Pressure | Permeability (Barrer) | | | | Ideal selectivity | | |
|---|---|---|---|---|---|---|---|
| (psi) | $CO_2$ | $CH_4$ | $N_2$ | $C_2H_6$ | $CO_2/CH_4$ | $N_2/CH_4$ | $C_2H_6/CH_4$ |
| 200 | 140.33 | 3.31 | 3.42 | 2.72 | 42.36 | 1.03 | 0.82 |
| 300 | 112.20 | 3.02 | 3.07 | 2.46 | 37.16 | 1.02 | 0.82 |
| 400 | 96.01 | 2.86 | 2.86 | 2.35 | 33.56 | 1.00 | 0.82 |
| 500 | 96.58 | 3.18 | 3.03 | 2.82 | 30.39 | 0.95 | 0.89 |
| 600 | 91.06 | 3.17 | 2.99 | 2.80 | 28.75 | 0.95 | 0.88 |
| 700 | 82.10 | 3.02 | 2.84 | 2.67 | 27.21 | 0.94 | 0.89 |
| 800 | 78.11 | 3.00 | 2.81 | 2.63 | 26.05 | 0.94 | 0.88 |

Example 4: Evaluation of the $CO_2/CH_4$ and $H_2S/CH_4$ Sour Mixed Gas Separation Performance of the 6FDA-Durene/CARDO Membrane Prepared in Example 1

The permeation properties of simulated sour gas mixtures consisting of 10; 48.6-60; 4.4-30; 0-3; and 0.01-36 volume percent of $CO_2$, $CH_4$, $N_2$, $C_2H_6$ and $H_2S$, respectively, passing through a membrane were studied at different gas feed pressure as shown in Table 7. Up to a maximum of about 36 volume percent $H_2S$ in the feed gas was applied to the membrane. The $CO_2/CH_4$ and $H_2S/CH_4$ ideal selectivities were in the range of 18-23 and 19-21, respectively; while $CO_2$ and $H_2S$ permeabilities were in the range of 38-51 Barrer and 40-47 Barrer respectively at 20 volume percent $H_2S$ in the feed gas. These values are comparable to high performance polymeric membranes.

TABLE 7

Sour mixed gases permeability and selectivity coefficients in the CARDO-type co-polyimide 6FDA-durene/CARDO (1:3) membrane as function $H_2S$ composition, acid gas ($CO_2$ + $H_2S$) partial pressure and total feed pressure at 22° C. using gas mixture containing 10; 48.6-60; 4.4-30; 0-3.0 and 0.01-36 volume percent of $CO_2$, $CH_4$, $N_2$, $C_2H_6$ and $H_2S$, respectively.

| $H_2S$ vol. % | Total feed pres. (psi) | Par. pres. $CO_2$ (psi) | Par. pres. $H_2S$ (psi) | Par. pres. ($CO_2$ + $H_2S$) (psi) | Permeability (Barrer) | | | | | Ideal selectivity | |
|---|---|---|---|---|---|---|---|---|---|---|---|
| | | | | | $N_2$ | $CH_4$ | $C_2H_6$ | $CO_2$ | $H_2S$ | $CO_2/CH_4$ | $H_2S/CH_4$ |
| 0.01 | 300 | 30.0 | 0.03 | 30.0 | 3.50 | 3.30 | 2.40 | 56.20 | 18.80 | 17.10 | 5.730 |
|  | 449 | 44.9 | 0.05 | 45.0 | 3.60 | 3.50 | 2.90 | 67.60 | 24.80 | 19.57 | 7.190 |
| 10.0 | 300 | 30.0 | 30.0 | 60.0 | 1.73 | 1.95 | 0.00 | 42.44 | 41.35 | 21.80 | 21.23 |
|  | 448 | 44.8 | 44.8 | 89.6 | 1.54 | 1.94 | 0.00 | 37.18 | 39.97 | 19.17 | 20.61 |
|  | 507 | 50.7 | 50.7 | 101 | 1.53 | 2.07 | 0.00 | 37.54 | 42.49 | 18.18 | 20.57 |
| 20.0 | 201 | 20.1 | 40.2 | 60.3 | 2.46 | 2.27 | 2.18 | 51.36 | 47.34 | 22.68 | 20.90 |
|  | 300 | 30.0 | 60.0 | 90.0 | 1.88 | 2.12 | 2.03 | 38.08 | 40.37 | 18.00 | 19.08 |
| 36.0 | 300 | 30.0 | 108 | 138 | 8.39 | 7.07 | 12.3 | 98.07 | 168.4 | 13.87 | 23.81 |
|  | 393 | 39.3 | 142 | 181 | 24.1 | 16.1 | 28.8 | 157.1 | 290.8 | 9.745 | 18.04 |

Gas mixture compositions in volume % were used as follows: For 0.01% $H_2S$: including 29% $N_2$; 59.99% $CH_4$; 10% $CO_2$; and 1% $C_2H_6$. For 10% $H_2S$: including 20% $N_2$; 60% $CH_4$; and 10% $CO_2$. For 20% $H_2S$: including 10% $N_2$; 57% $CH_4$; 10% $CO_2$; and 3% $C_2H_6$. For 36% $H_2S$: including 4.4% $N_2$; 48.6% $CH_4$; 10% $CO_2$; and 1% $C_2H_6$.

Membranes of the present disclosure exhibit excellent pure and gas mixture permeation properties, as pure gas $CO_2$ permeability in a range of about 175-239 Barrer and $CO_2/CH_4$ selectivity of up to 39 were obtained at about 35° C. and feed pressure of up to about 400 psi. These results are unique as they are better than those obtained in industrially used glassy polymers. Moreover, these values are advantageous compared to other high-performance glassy polymer membranes that have been reported.

Furthermore, at moderate feed pressure and 36 vol. % $H_2S$ in a feed gas mixture (consisting of $CO_2$, $N_2$, $CH_4$ and $H_2S$), $CO_2$ and $H_2S$ permeabilities and $H_2S/CH_4$ and $CO_2/CH_4$ ideal selectivities exhibited by the membrane (see Table 7) are higher than those obtained by industrial commercial membranes, and better than other high-performance glassy membranes that have been reported. Moreover, the $CO_2/CH_4$ selectivity of the co-polyimides does not degrade to anywhere near the same extent as was reported for cellulose acetate (CA), even under these much more aggressive environments. This stability at moderate pressures and extremely high $H_2S$ concentration is quite surprising and unexpected.

Newly-developed CARDO-type aromatic random and block co-polyimide membranes exhibit excellent pure and gas mixture permeation properties, which are unique and among the highest ever reported as they are much higher than those obtained in the industrially used glassy polymers. Moreover, the $CO_2/CH_4$ selectivity does not degrade or suffer significant loss to anywhere near the same extent as was reported for cellulose acetate (CA) (commercial membrane), even under these much more aggressive environments.

Embodiments of the present disclosure including aromatic random and block co-polyimides provide superior efficiency, productivity, and resistance to penetrant-induced plasticization compared to CA, which is presently the industrial standard membrane material for $CO_2$ separations. Among the polymers for gas separation membranes, aromatic polyimides are one of the most attractive and promising materials due to their excellent properties such as high thermal stability, chemical resistance, and mechanical strength.

Both of these polymer properties can help a membrane structure made from polyimide to withstand deterioration due to the wet conditions often found with natural gas streams. The performance described previously for the developed materials is much higher than those obtained in current commercial membranes. Moreover, the $CO_2/CH_4$ and $H_2S/CH_4$ selectivities of the co-polyimides do not degrade to anywhere near the same extent as was reported for CA and other commercial membranes, even under these much more aggressive environments.

Figure 4:
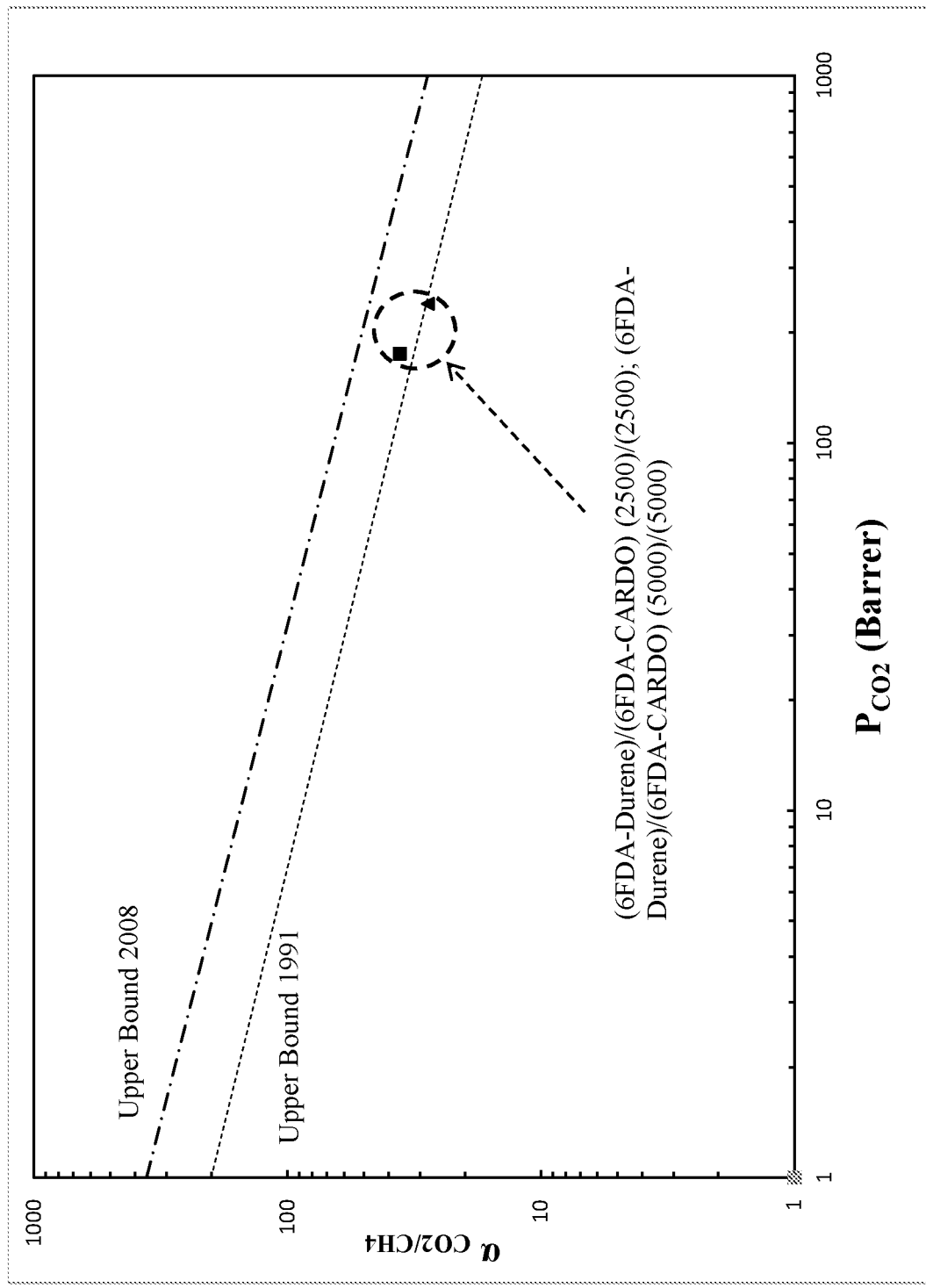
FIG. 4 is a graph showing $CO_2/CH_4$ permeability-selectivity for the (6FDA-durene)/(6FDA-CARDO) (2,500)/(2,500) block co-polyimide membrane and the (6FDA-durene)/(6FDA-CARDO) (5,000)/(5,000) block co-polyimide membrane in pure gas feeds.

FIG. 4 is a graph showing $CO_2/CH_4$ permeability-selectivity for the (6FDA-durene)/(6FDA-CARDO) (2,500)/(2,500) block co-polyimide membrane and the (6FDA-durene)/(6FDA-CARDO) (5,000)/(5,000) block co-polyimide membrane in pure gas feeds.

Figure 5:
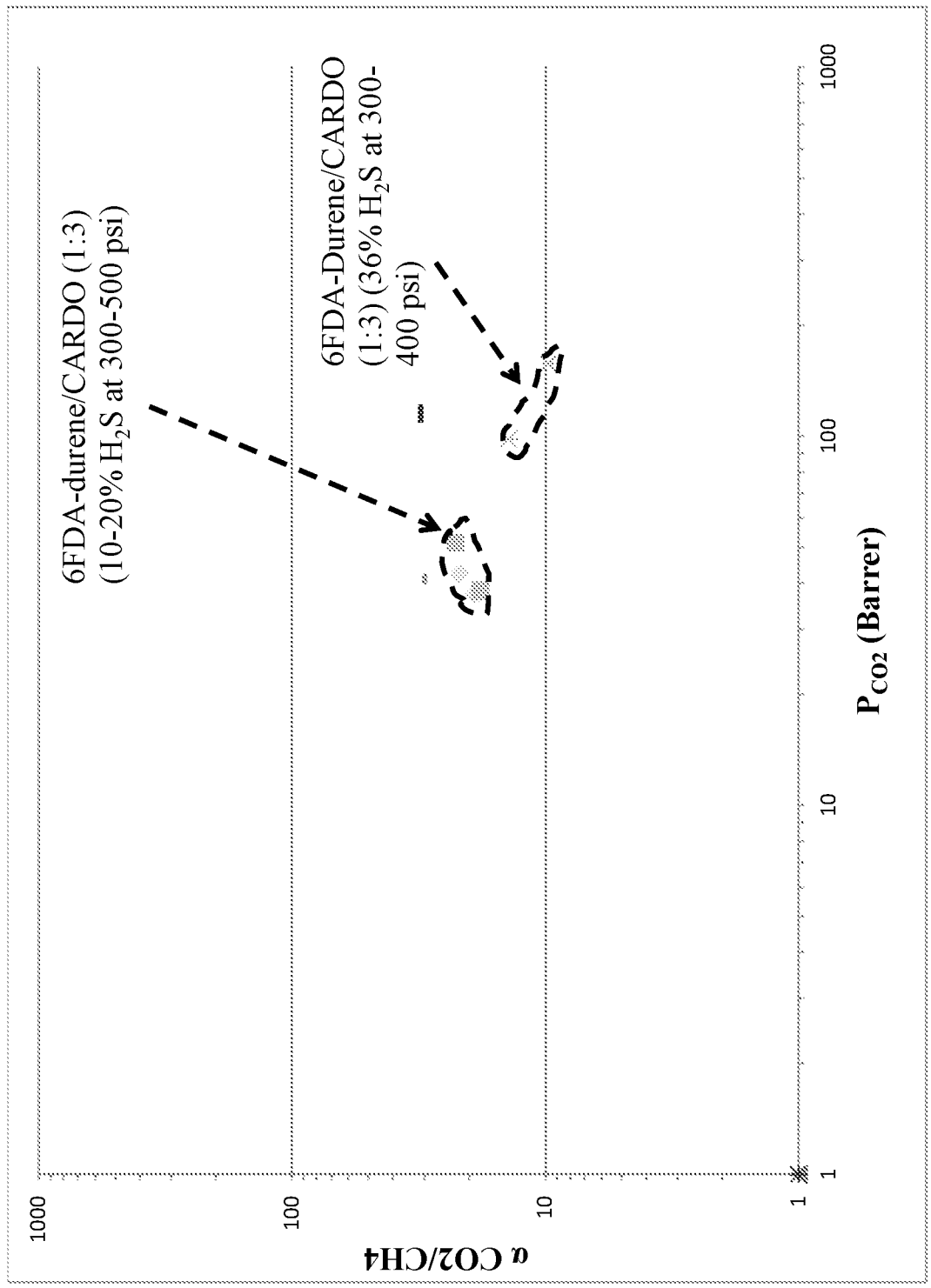
FIG. 5 is a graph showing $CO_2/CH_4$ permeability-selectivity for a 6FDA-durene/CARDO (1:3) co-polyimide membrane sample of the present disclosure in a ternary $H_2S/CO_2/CH_4$ feed mixture.

FIG. 5 is a graph showing $CO_2/CH_4$ permeability-selectivity for the random 6FDA-durene/CARDO (1:3) co-polyimide membrane sample of the present disclosure in ternary $H_2S/CO_2/CH_4$ feed mixtures.

Figure 6:
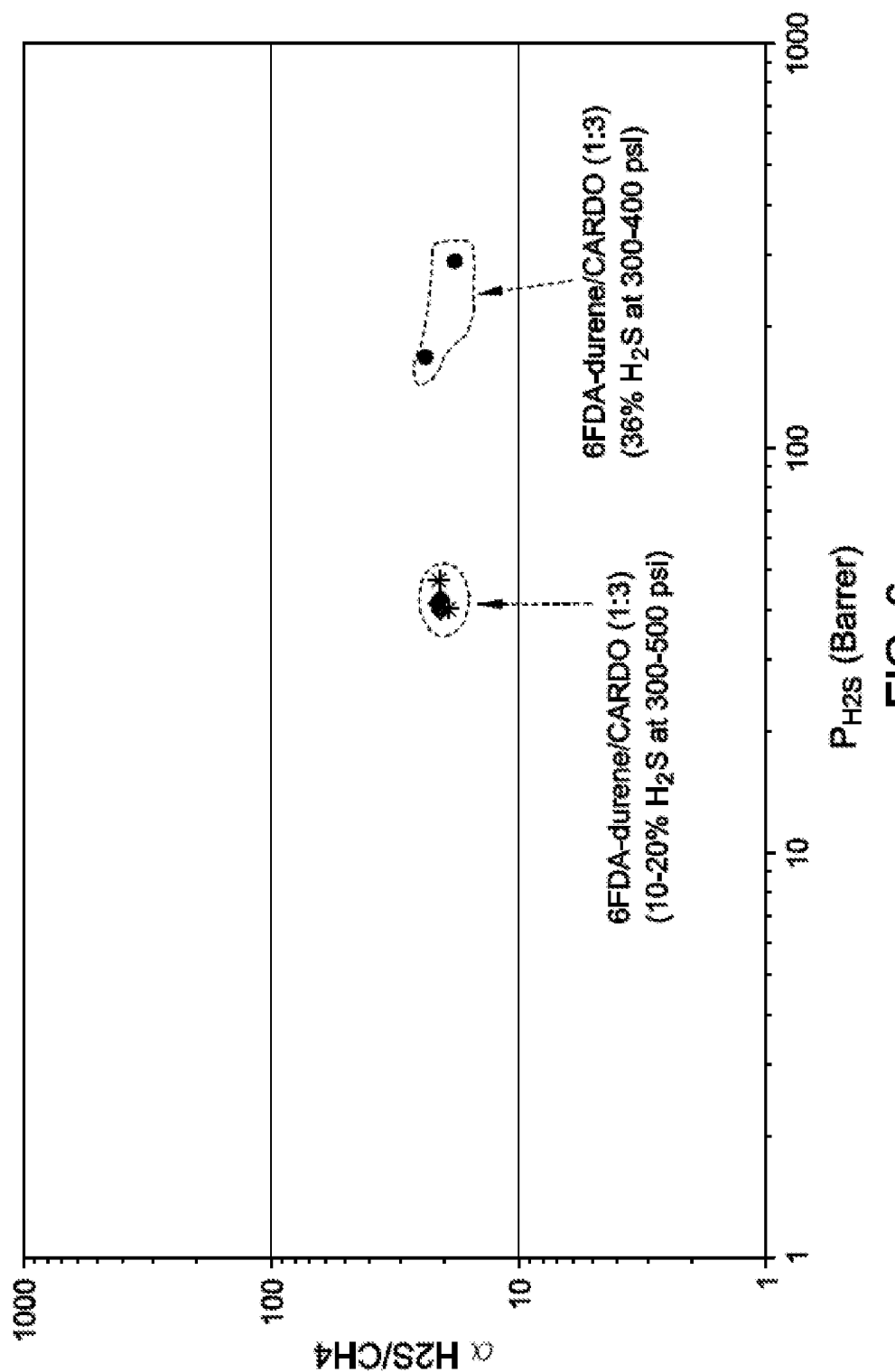
FIG. 6 is a graph showing $H_2S/CH_4$ permeability-selectivity for the 6FDA-durene/CARDO (1:3) co-polyimide membrane sample of the present disclosure in a ternary H2S/CO2/CH4 feed mixture.

FIG. 6 is a graph showing $H_2S/CH_4$ permeability-selectivity for the 6FDA-durene/CARDO (1:3) co-polyimide membrane sample of the present disclosure in ternary $H_2S/CO_2/CH_4$ feed mixtures.

Currently, limited data have been reported on the development of membrane materials for aggressive sour gas separations. Embodiments of the present disclosure have advantages over commercially available membranes as the aromatic co-polyimides being disclosed here give better selectivity, permeability, and resistance to penetrant-induced plasticization compared to CA, which is the presently the industrial standard membrane material for $CO_2$ separations.

Aromatic polyimides provide high thermal stability, chemical resistance, and mechanical strength. These polymer properties help a membrane structure made from polyimide to withstand deterioration due to the wet conditions often found with natural gas streams. This is evident from the results obtained for the co-polyimides, which exhibit $H_2S/CH_4$ and $CO_2/CH_4$ selectivities in the range of 19-21 and 18-23, respectively, and $CO_2$ and $H_2S$ permeabilities in the range of 38-51 Barrer and 40-47 Barrer, respectively, at moderate feed pressure and 20 vol. % $H_2S$ in a feed gas mixture. This performance is much higher than those obtained in most of current commercial membranes. Moreover, the $CO_2/CH_4$ and $H_2S/CH_4$ selectivities of the co-polyimides do not degrade to anywhere near the same extent as was reported for CA and other commercial membranes, even under these much more aggressive environments.

The singular forms "a," "an," and "the" include plural referents, unless the context clearly dictates otherwise.

In the drawings and specification, there have been disclosed embodiments of apparatus, systems, and methods for aromatic co-polyimide membranes for sour natural gas separation, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A membrane for separating the components of a sour natural gas feed, the membrane comprising:
at least three distinct moieties polymerized together, the moieties including a 2,2'-bis(3,4-dicarboxyphenyl)hexafluoropropane dianhydride (6FDA) based moiety; a 9,9-bis(4-aminophenyl) fluorene (CARDO) based moiety; and 2,3,5,6-tetramethyl-1,4-phenylenediamine (durene diamine) based moiety.

2. The membrane according to claim 1, where the membrane comprises random co-polymers.

3. The membrane according to claim 2, where the molar ratio of the durene diamine based moiety to the CARDO based moiety is about 3:1.

4. The membrane according to claim 2, where the molar ratio of the durene diamine based moiety to the CARDO based moiety is about 1:1.

5. The membrane according to claim 2, where the molar ratio of the durene diamine based moiety to the CARDO based moiety is about 1:3.

6. The membrane according to claim 1, where the membrane comprises block co-polymers.

7. The membrane according to claim 6, where the block co-polymers include a polymer block L of the 6FDA and the durene diamine based moiety, and include a polymer block M of the 6FDA and the CARDO based moiety, and a block ratio of L to M is about between (1,000-20,000) to (1,000-20,000).

8. The membrane according to claim 7, where the block ratio of L to M is about (2,500) to (2,500).

9. The membrane according to claim 7, where the block ratio of L to M is about (5,000) to (5,000).

10. The membrane according to claim 7, where the block ratio of L to M is about (15,000) to (15,000).

11. A method of gas separation, the method comprising the step of:
applying the membrane of claim 1 to separate at least 2 components of a mixed gas stream.

12. A method for making a membrane for separating components of a sour natural gas feed, the method comprising the steps of:
combining at least three different monomers to form a co-polyimide, the monomers including 2,2'-bis(3,4-dicarboxyphenyl)hexafluoropropane dianhydride (6FDA); 9,9-bis(4-aminophenyl) fluorene (CARDO); and 2,3,5,6-tetramethyl-1,4-phenylenediamine (durene);

and
preparing a dense film from the co-polyimide using a solution casting process.

13. The method according to claim 11, further comprising the step of using the dense film to separate components of a gas stream.

14. The method according to claim 12, where the three different monomers are combined to create random co-polymers.

15. The method according to claim 14, where the molar ratio of the durene diamine to the CARDO is about 3:1.

16. The method according to claim 14, where the molar ratio of the durene diamine to the CARDO is about 1:1.

17. The method according to claim 14, where the molar ratio of the durene diamine to the CARDO is about 1:3.

18. The method according to claim 12, where the three different monomers are combined to create block co-polymers.

19. The method according to claim 18, where the block co-polymers include a polymer block L of the 6FDA and the durene diamine and include a polymer block M of the 6FDA and the CARDO, and a block ratio of L to M is about between (1,000-20,000) to (1,000-20,000).

* * * * *